United States Patent [19]

Starkovich

[11] Patent Number: 5,428,988
[45] Date of Patent: Jul. 4, 1995

[54] LEAK DETECTOR FOR GAS AIR BAG INFLATOR

[75] Inventor: John A. Starkovich, Redondo Beach, Calif.

[73] Assignee: TRW Vehicle Safety Systems Inc., Lyndhurst, Ohio

[21] Appl. No.: 166,519

[22] Filed: Dec. 13, 1993

[51] Int. Cl.6 .................. G01N 25/22; G01M 3/04
[52] U.S. Cl. .................... 73/40; 73/23.31; 73/25.03; 180/282; 280/741; 280/728.1
[58] Field of Search .............. 73/49.2, 23.31, 25.03, 73/31.06; 280/741, 728 R, 736; 180/268, 282

[56] References Cited

U.S. PATENT DOCUMENTS

| | | | |
|---|---|---|---|
| 3,352,146 | 11/1967 | Lyssy | 73/25.03 |
| 3,413,837 | 12/1968 | Bui-Al et al. | 73/25.03 |
| 3,959,764 | 5/1976 | Allman | 73/25.03 |
| 4,164,699 | 8/1979 | Timoshenko et al. | 324/75 A |
| 4,241,019 | 12/1980 | Nakatani et al. | 422/94 |
| 4,305,724 | 12/1981 | Micko | 23/232 |
| 4,369,647 | 1/1983 | Shigemori et al. | 73/27 R |
| 4,580,439 | 4/1986 | Manaka | 73/23 |
| 4,730,478 | 3/1988 | Gedeon | 73/23 |
| 4,779,078 | 10/1988 | Ciolli | 340/634 |
| 4,,792,433 | 12/1988 | Katsura et al. | 422/98 |
| 4,792,433 | 12/1988 | Schuck et al. | 436/143 |
| 4,806,314 | 2/1989 | Fertig et al. | 422/78 |
| 4,817,414 | 4/1989 | Hagen et al. | 73/25.03 |
| 4,854,155 | 8/1989 | Poli | 73/27 R |
| 4,911,892 | 3/1990 | Grace et al. | 422/94 |
| 5,218,347 | 6/1993 | Deppe | 340/634 |

Primary Examiner—Hezron E. Williams
Assistant Examiner—J. David Wiggins
Attorney, Agent, or Firm—Tarolli, Sundheim & Covell

[57] ABSTRACT

The present invention relates to a detector for detecting leaks of a gas. The present invention is particularly applicable to a vehicle occupant restraint apparatus (10) which has a container (14) for an exothermically reactable gas mixture (18). An exothermic reaction of the gas mixture (18) released from container (14) deploys an occupant restraint (12). The detector has an electrically conductive sensor element (44). The sensor element (44) is positioned within an envelope (40) surrounding a portion of container (14) so as to be exposed to the gas mixture (18) if leaked from container (14). The sensor element (44) is part of an electric circuit (46). The electrical resistance of the sensor element (44) varies when the sensor element is exposed to the leaked gas mixture. The electric circuit (46) also has a power source (64) including a timing circuit (52) for providing an intermittent electric current through the sensor element (44). The timing circuit (52) has an off-period of relatively long duration. This allows the gas if leaked into the envelope (40) to accumulate in the area of the sensor element (44).

45 Claims, 4 Drawing Sheets

LEAK DETECTOR FOR GAS AIR BAG INFLATOR

BACKGROUND OF THE INVENTION

1. Technical Field

The present invention relates to a detector for detecting leaks of a gas from a container for the gas.

2. Description of the Prior Art

U.S. Pat. No. 4,164,699 to Timoshenko et al. discloses a gas detector which has a thermistor within an electrical circuit. The thermistor is a platinum wire. The platinum functions as a catalyst for the combustion of the gas being detected. This combustion raises the temperature of the platinum wire, which changes the wire's resistance. The change in resistance is detected in the electrical circuit.

U.S. Pat. No. 4,806,314 to Fertig et al. discloses a detector suitable for detecting low concentrations of a hydrocarbon contaminant in an air stream. The detector contains a resistance element which is positioned in the air stream. The resistance element is coated with palladium. When the resistance element is electrically heated, the palladium functions as a catalyst to oxidize exothermically the hydrocarbon contaminant in the air stream. The detector has a second resistance element which is positioned in the air stream ahead of the palladium coated resistance element. The second resistance element is provided with an intermittent current. When the current to the second resistance element is on, the hydrocarbon contaminant is oxidized, and no oxidation takes place at the palladium coated element. This provides a reference noise level for the palladium coated element.

U.S. Pat. No. 4,854,155 to Poll discloses a catalytic gas detector which includes a resistance gas sensing element in a bridge circuit. A first power source is connected to terminals of the bridge circuit. The circuit has a second power source which includes a timer. The purpose of the second power source and timer is to direct a temporary current of relatively high voltage through the sensing element to burn off impurities on the surface of the sensing element.

SUMMARY OF THE INVENTION

The present invention relates to a detector for detecting leaks of a gas. The detector has an electrically conductive sensor element. The sensor element is positioned so as to be exposed to the gas if leaked. The sensor element is part of an electric circuit. The electrical resistance of the sensor element varies when the sensor element is exposed to the leaked gas. The electric circuit also has a power source including a timing means for providing an intermittent electric current through the sensor element. The timing means has an off-period of relatively long duration. This allows the gas if leaked to accumulate in the area of the sensor element.

The present invention is particularly applicable where the gas to be detected is an exothermically reactable gas. An example of an exothermically reactable gas is hydrogen. The sensor element is a material which preferably catalytically initiates the exothermic reaction of the gas when an electric current is passed through the sensor element. The exothermic reaction heats the sensor element. The resistance of the sensor element is changed by the temperature increase of the sensor element.

In one embodiment, the electric circuit has an indicator means. The indicator means detects the change in resistance of the sensor element thereby indicating the existence of a leak.

In an alternative embodiment, the sensor element is a fuse. The sensor element, when heated by the exothermic reaction of the leaked gas, melts or exhibits a phase change which interrupts the circuit. An indicator means detects the interruption of the circuit.

In a further embodiment, the sensor element is a material which absorbs and stores the leaked gas and exhibits a resistance change solely as a result of this absorption and storage. An indicator means detects the change in resistance indicating the existence of a leak.

Preferably, the sensor element is a material which both catalytically initiates an exothermic reaction of the exothermically reactable gas and has absorption and storage capability. During an off-period of the timing means, leaked gas is absorbed and stored in the sensor element. During an on-period of the timing means, the leaked gas is desorbed from the sensor element and is catalytically and exothermically reacted by the sensor element. This increases the temperature of the sensor element. The temperature increase changes the resistance of the sensor element. An indicator means detects the change in resistance, indicating the existence of a leak. A preferred material of the sensor element, which has both catalytic and absorption and storage capabilities, is palladium.

The present invention relates particularly to a vehicle occupant restraint. The restraint comprises a container for a gaseous mixture. The gaseous mixture comprises, as one component, an exothermically reactable gas. A sensor element of the leak detector of the present invention is positioned in the vicinity of the container. In the event of a leak of gas from the container, the gas accumulates in the area of the sensor element during the period when no current is passed through the sensor element. If the amount accumulated is an effective amount to produce a detectable resistance change in the sensor element, the leak from the container is detected.

The present invention also relates to a method for detecting leaks which includes the use of the aforementioned leak detecting apparatus.

BRIEF DESCRIPTION OF THE DRAWINGS

Further features and advantages of the present invention will become apparent to those skilled in the art upon consideration of the following specification, with reference to the accompanying drawings, in which.

DESCRIPTION OF PREFERRED EMBODIMENTS

The present invention is a gas leak detector. The gas leak detector of the present invention is particularly useful in connection with a vehicle occupant restraint apparatus. Such a restraint apparatus is disclosed in co-pending application Ser. No. 947,147, filed Sep. 18, 1992, assigned to the assignee of the present application. A schematic of the vehicle occupant restraint apparatus is shown in FIG. 1 and designated 10.

Figure 1:
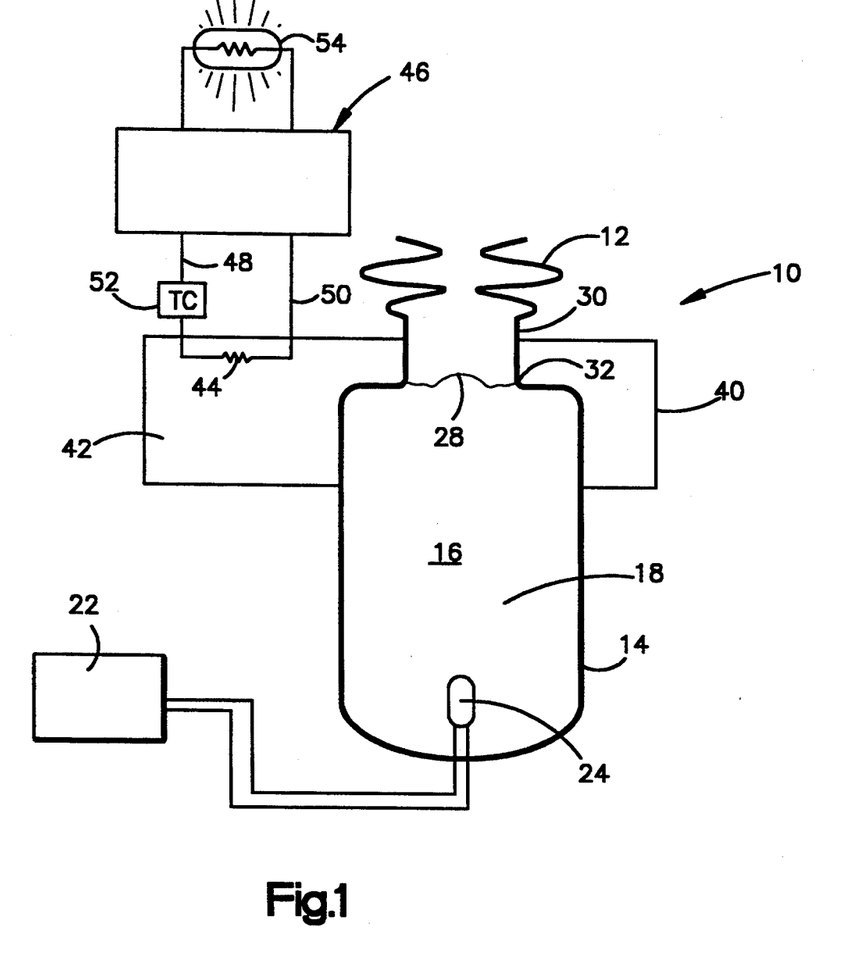
FIG. 1 is a schematic diagram of a vehicle occupant restraint apparatus and leak detector for the restraint apparatus in accordance with the present invention.

Referring to FIG. 1, the vehicle occupant restraint apparatus 10 includes an inflatable occupant restraint 12, such as an air bag. The apparatus 10 also comprises a container 14. The container 14 has a chamber 16 which holds a mixture 18 of gases. The mixture 18 of gases may include, by way of example, a fuel gas, an oxidizer gas for supporting combustion of the fuel gas, and an inert gas. The inert gas may be nitrogen, argon, or a mixture of nitrogen and argon. The oxidizer gas may be oxygen or other known oxidizing gases. The fuel gas is preferably hydrogen, but can be another fuel gas such as a hydrocarbon, or mixture of hydrogen with another fuel gas. Examples of fuel gases other than hydrogen are methane, propane, acetylene and carbon monoxide.

The mixture 18 of gases can have many different compositions. The fuel gas may be 2 to 16 molar percent of the mixture 18 of gases. The oxidizer gas may be 7 to 98 molar percent of the mixture 18 of gases. The balance is inert gas which may be 0 to 91 molar percent of the mixture 18 of gases. The mixture 18 of gases may include 10-14 molar percent hydrogen, 15-25 molar percent oxygen, and 61-75 molar percent inert gas.

A preferred mixture 18 of gases is dry air and hydrogen. The mixture of dry air and hydrogen may range from 86 molar percent air and 14 molar percent hydrogen to 92 molar percent air and 8 molar percent hydrogen. A preferred range is from 90 molar percent air and 10 molar percent hydrogen to 87 molar percent air and 13 molar percent hydrogen.

The mixture 18 of gases in the container 14 is normally under pressure. The pressure depends upon such factors as the volume of the vehicle occupant restraint 12 to be inflated, the time available for inflation, the inflation pressure desired, the volume of the container for the mixture 18 of gases, and the percentage of each of the gases in the mixture 18 of gases. Normally, the mixture 18 of gases in the container 14 may be at a pressure of 500 to 5,000 pounds per square inch (psi). Preferably, the mixture 18 of gases in the container 14 is at a pressure of 1,000 to 3,000 psi. However, this invention is applicable to any mixture of gases regardless of pressure.

The embodiment illustrated in FIG. 1 is only one example of various embodiments with which the present invention may be used. In this embodiment, upon the occurrence of a sudden vehicle deceleration indicative of a collision, a deceleration sensor 22, of any known and suitable construction, activates an igniter 24 in the chamber 16. This ignites the fuel gas in the mixture 18 of gases. The combustion of the fuel gas is supported by the oxidizer gas. As the fuel gas burns, the pressure in the chamber rises due to warming of the gases by the heat of combustion. After a predetermined time, or when a predetermined pressure is reached in the chamber 16, an end wall 28 of the container 14 bursts, and warm gas flows into the vehicle occupant restraint 12 through a manifold 30. As the gas flows into the vehicle occupant restraint 12, the gas inflates the vehicle occupant restraint into position for restraining a vehicle occupant.

The container 14 preferably is made of a metal having a sufficient tensile strength to contain the mixture 18 of gases. One suitable metal is aluminum. The manifold 30, which connects the restraint 12 to the container 14, is also of metal. In the illustrated embodiment, the manifold 30 is welded to the container 14 by an annular weld joint 32. It is desirable to detect a leak which may develop, at the weld joint 32. The leak may develop after a long period of usage of a vehicle in which the apparatus 10 is installed, during handling and storage of the apparatus 10 prior to installation in a vehicle, or during installation of the apparatus 10 in a vehicle.

In accordance with the present invention, leak detection is accomplished by placing an envelope 40 around the weld joint 32. The envelope 40 is a light-weight, thin-walled member of a suitable gas impervious material, such as plastic, glass or metal. The envelope 40 contains an atmosphere 42 at ambient pressure. The atmosphere 42 contains oxygen. The atmosphere 42 can be air. The envelope 40 can be thin-walled since it is not designed to contain gas at a high pressure. The envelope 40 is designed to contain gas which may leak into the atmosphere 42 from the container 14, through the weld joint 32. The envelope 42, however, may or may not be hermetically sealed to the container 14. The envelope 40 can be secured to the outer wall of the container 14, around the manifold 30, using any suitable bonding method which isolates the atmosphere 42 in the envelope 40 from the atmosphere outside the envelope 40. The size of the envelope 40 is exaggerated in FIG. 1 for clarity. Normally, the envelope will have a small capacity, for instance about 20 to about 100 cubic centimeters.

The leak detector has a sensor element 44 which is contained within the envelope 40. The sensor element 44 is electrically conductive. The sensor element 44 is part of an electrical circuit 46 which includes leads 48 and 50. The leads 48 and 50 penetrate the envelope 40 and are bonded to the envelope 40 or attached to some heavier gauge material which is bonded to the envelope. The leads support the sensor element 44 so that it is exposed to the atmosphere 42 and is relatively close to the weld joint 32.

The electrical circuit 46 includes a power source (not shown) and a timing circuit (TC) 52. The timing circuit 52 has successive on-off periods and functions, with the power source, to provide an intermittent current to the sensor element 44. The off-period of the timing circuit is of relatively long duration, for instance, 24 to 48 hours. This allows any gas which leaks from the container 14 at the weld joint 32 to accumulate within the envelope 40. The on-period of the timing circuit is of relatively short duration, only a few microseconds to several seconds, but is sufficient to conduct a current through the sensor element 44.

The sensor element 44 has an electrical resistance which varies if the sensor element is exposed to fuel gas leaked into the envelope 40 from the container 14. The electrical circuit 46 contains an indicator means 54. The indicator means 54 is responsive to a change in the electrical resistance of the sensor element 44 when a current is passed through the sensor element during an on-period of the timing circuit. The indicator means 54 provides an indication of a leak of gas from the container 14, and of possible inoperativeness of the vehicle occupant restraint apparatus.

Preferably, the sensor element 44 comprises a material which is capable of absorbing and storing the fuel gas which is leaked into the envelope 40. The leak of fuel gas from the container 14 can be a fast leak or a slow leak. If the leak from container 14 is a fast leak, the contents of container 14 can be depleted in a short period of time, for instance in a month or less. A vehicle can be out of operation for this period of time. It is therefore possible for this depletion to occur over a period of time in which the vehicle is out of operation. As the envelope 40 need not necessarily be hermetically sealed to the container 14, it is also possible for the leaked fuel gas to be dissipated from the envelope 40 during this period of time. By employing a sensor element 44 having an absorptive capability, the sensor element in effect stores the leaked fuel gas. When operation of the vehicle is resumed, a current is passed through the sensor element during an on-period of the timing circuit 52, and the amount of the stored gas is sufficient to be detected. The detection activates the indicator means 54, which provides an indication that a leak has occurred.

A preferred material, useful in the present invention, which is capable of absorption and storage of a gas, when exposed to the gas, is palladium. Palladium has an effective gas storage capability. Palladium is particularly effective for the storage of hydrogen. Other materials having a gas storage capability include vanadium, tantalum, titanium, zirconium, thorium and cesium.

The exact mechanism of absorption and storage is not known. It may be physiosorption, chemisorption, hydride or other compound formation, or combination of the above. Regardless, the absorption occurs during the time when no current is passed through the sensor element 44 by timing circuit 52. This requires an off-period of relatively long duration by the timing circuit 52. If a continuous current is passed through the sensor element 44, the leaked gas is continuously consumed and no detectable resistance change in the sensor element occurs.

In one embodiment of the present invention, the sensor element 44 absorbs the leaked fuel gas and exhibits a detectable resistance change solely as a result of such absorption. An example is the absorption of hydrogen in palladium. The palladium undergoes a detectable electrical resistance change solely as a result of the absorption of the hydrogen. The resistance change is detectable on operation of the vehicle, by passing a current through the sensor element 44 and by direct measurement of the sensor element resistance using a sensitive resistance measuring device.

In a preferred embodiment of the present invention, the material of the sensor element 44 is capable of catalytically supporting an exothermic reaction of the fuel gas which is leaked into the envelope 40. The electric current passed through the sensor element, during an on-period of the timing circuit 52, activates the sensor element. The catalytic material provides a large number of active sites. When an electric current of short duration, e.g., ranging from a few microseconds to a few seconds, is passed through the sensor element, this raises the temperature of the sensor element to 100°-200° C. This temperature is sufficient to cause the gas to react in a combustion reaction. An example is the leak of hydrogen into envelope 40 and the reaction of hydrogen with oxygen in the envelope. The combustion reaction is heterogeneous. A heterogeneous reaction is one that takes place at the surface of the catalytic material. The combustion reaction causes the sensor element 44 to heat further. The temperature increase of the sensor element increases the resistance of the sensor element, which is detected by the indicator means 54 in the electrical circuit 46.

The leak of the fuel gas from the container 14 into the envelope 40 can be a very slow leak, taking place, by way of example, over a period of three to four years, or longer, e.g., up to fifteen years. If the leak is minuscule, that is, less than the above-defined "very slow leak", then it is not of consequence. The contents of the container 14 would be expected to last the life of the vehicle, or at least a defined period, at the end of which the restraint apparatus would be serviced as a matter of course.

However, with a very slow leak, as above defined, the concentration of the fuel gas in the envelope 40 may be very small. It has been determined that even with an off-period of 24–48 hours, starting with a concentration of fuel gas in the container 14 of about 10–13 mole percent, the envelope 40 will accumulate a concentration of only about 0.1 mole percent. With a concentration of fuel gas in the envelope 40 less than about 5 $\frac{1}{2}$ mole percent, the gas will not have an exothermic reaction, at a low sensor element temperature, unless the reaction is catalytically supported.

By employing a sensor element 44 capable of catalytically supporting an exothermic reaction, very low concentrations of fuel gas in the envelope 40 can be detected by the sensor element.

Materials which are capable of catalytically promoting an exothermic combustion reaction are members of the platinum group of metals. This group includes platinum, palladium, osmium, iridium, ruthenium and rhodium. Alloys and compounds of the platinum group metals can also be used, such as palladium gold.

Preferably, the sensor element 44 is one which both supports catalytic activity and is capable of absorption and storage. Palladium is a preferred material which provides both capabilities.

When the palladium sensor element is exposed to leaked gas, during an off-period of the timing circuit 52, the sensor element absorbs and stores the gas. When an electric current of short duration, ranging from a few microseconds to a few seconds, is then passed through the sensor element 44, this raises the temperature of the sensor element to 100°-200° C., by way of example. This causes the reverse mechanism of the absorption, or desorption, to take place. As with the mechanism of absorption and storage, the exact mechanism of desorption is not known. The mechanism could include hydride decomposition. This releases the fuel gas into the envelope 40. The sensor element catalytic surface provides a large number of active sites for the combustion of the fuel gas by oxygen in the envelope 40. The combustion causes the sensor element to become further heated, which is detected in the electrical circuit 46, indicating that a leak has occurred.

The following examples illustrate the present invention.

EXAMPLE 1

In this embodiment of the present invention, the sensor element 44 is a palladium filament. The gas to be detected is hydrogen. The palladium filament has both catalytic activity and hydrogen absorption and storage capability.

Figure 2:
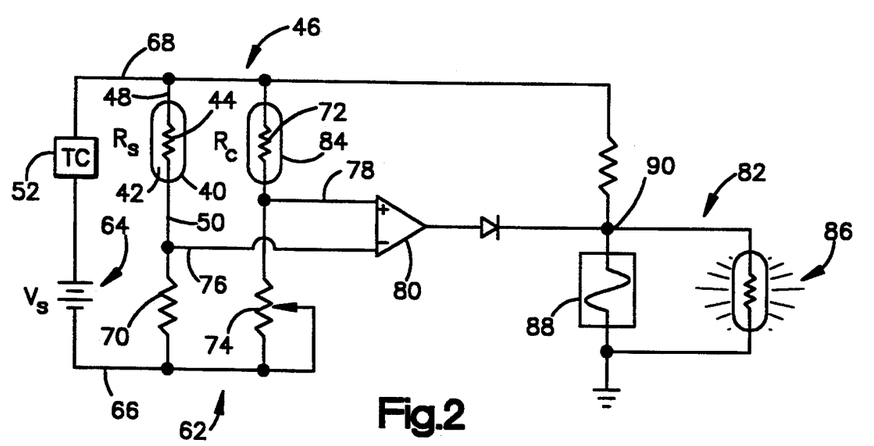
FIG. 2 is an electrical bridge circuit including a sensor filament for the vehicle occupant restraint apparatus of FIG. 1 in accordance with one embodiment of the present invention.

An electrical circuit 46, as illustrated in FIG. 2, is used. In this Figure, components serving the same functions as components of FIG. 1 will be given the same reference numbers. The sensor element 44 is positioned within an envelope 40 which is shown schematically. Leads 48 and 50 penetrate the envelope 40 and support the sensor element 44 so that it is exposed to an ambient atmosphere 42 within the envelope 40.

The circuit 46 includes a timing circuit ($T_c$) 52 and a bridge circuit 62. The timing circuit 52 receives power from a voltage source ($V_s$) 64. The timing circuit 52 has a timing switch (not shown), such as one sold by Motorola Corporation known as a 555 timer. The 555 timer controls a relay which allows the flow of current from the voltage source 64 to the rest of the circuit 46. The timing circuit 52 is connected by leads 66 and 68 to the bridge circuit 62, and provides the bridge circuit with an intermittent current of predetermined on and off durations.

The bridge circuit 62 has resistors 70, ($R_c$) 72 and 74, connected in the arms of the bridge circuit, in addition to the sensor element 44. The sensor element 44 is a resistor, similar to resistors 70, 72 and 74. The arm containing resistors 44 and 70 is in parallel with the arm containing resistors 72 and 74. The timing circuit 52 and voltage source 64 are connected across the parallel arms of the bridge circuit 62. The bridge circuit 62 is connected by connectors 76 and 78 to a differential amplifier 80, which is connected to an indicator circuit 82.

The resistor 74 in the bridge circuit is a variable resistor and can be adjusted so that the bridge circuit 62 is normally in a balanced state and produces no voltage output to amplifier 80.

The resistance of a resistor varies with changes in the ambient temperature. The change in ambient temperature to which the apparatus of the present invention may be exposed, for instance in a vehicle, can be substantial, for instance from about $-40°$ C. to about $+85°$ C. The resistor ($R_c$) 72 is a compensating resistor. The purpose of the compensating resistor 72 is to provide a resistance change, due to an ambient temperature change, which is equal to the resistance change in resistor 44 due to the same temperature change. The resistor 72 is contained within an envelope 84. Preferably, the envelope 84 for resistor 72 is the same envelope as envelope 40 for resistor 44. The resistor 72 is made of the same material as resistor 44 and has the same dimensions as resistor 44. The surface of the resistor 72 is poisoned with a thin non-catalytic coating, such as a gold, glass, nickel or lead coating, so that no catalytic action takes place at the surface of the resistor 72. Alternatively, the resistor 72 can be a filament of a non-catalytic material which has the same temperature/resistance coefficient as palladium. Thus, the bridge circuit 62, once balanced by resistor 74, will remain balanced regardless of the ambient temperature to which the bridge circuit is exposed.

During an on-period of the timing circuit 52, the current flows equally in the arms of the bridge circuit 62, so that no imbalance occurs due to this current flow. However, if an exothermic reaction takes place at the surface of the sensor element 44, and not at the surface of the resistor 72, a resistance imbalance in the bridge circuit occurs. This produces a voltage differential across the junction between the sensor element 44 and resistor 70 and the junction between the resistors 72 and 74. This output voltage differential is amplified by the differential amplifier 80 and is supplied to the indicator circuit 82 which provides an indication of the imbalance.

The indicator circuit 82 comprises an alarm indicator 86 and a fuse 88. The fuse 88 has a very low resistance compared to that of the alarm indicator 86. The amplified current thus flows primarily through the fuse 88 and is of sufficient intensity to melt the fuse. The current flow is then directed through the alarm indicator 86 causing the alarm indicator to emit a signal indicative of the imbalance in the bridge circuit 62.

In operation, the envelope 40 surrounds at least a portion of a gas container for a vehicle occupant restraint. The gas contains about 10 to 13 molar percent hydrogen. During an off-period of the timing circuit 52, the hydrogen, in the event of a leak in the container, is absorbed by the palladium of the sensor element 44. No electric current flows through the sensor element, and no exothermic reaction of the hydrogen takes place. This is because the palladium is an effective catalyst for the reaction of small concentrations of hydrogen and oxygen only when heated to a temperature of about 100° to 200° C. During the off-period, the sensor element 44 is at ambient temperature, well below this reaction temperature.

When an electric current is directed through the sensor element 44, during the next on-period of the timing circuit 52, the sensor element 44 is heated to the 100° to 200° C. range. The hydrogen which was absorbed by the sensor element is desorbed. This hydrogen and any residual hydrogen present in the container 40 as gas now react exothermically to produce additional heat. If the exothermic reaction at this point is of sufficient intensity due to sufficient hydrogen reacting, the voltage imbalance will be established to cause the fuse 88 to melt and the alarm indicator 86 to be actuated.

The off-period of the electrical circuit 46 is necessary to be able to detect very slow leaks. If the palladium sensor element 44 is continuously electrically heated, it will continuously consume the hydrogen which is leaked. With a very slow leak, hydrogen will not accumulate at the surface of or within the palladium sensor element or in the gaseous region around the element in sufficient quantities to activate the indicator circuit 82. The off-period has to be sufficiently long to obtain a build-up of hydrogen in the atmosphere 42 or in the sensor element 44 to provide the threshold voltage imbalance which is necessary to cause the fuse 88 to melt.

The duration of the on-period of the apparatus 10 of the present invention is that sufficient to heat the sensor element 44 to a temperature at which the sensor element initiates the exothermic reaction of the fuel gas, e.g., hydrogen, which is leaked into the atmosphere 42 of the envelope 40. Normally, this will be a period ranging from a few microseconds to several seconds.

The specific duration of the on and off periods of the timing circuit 52 are dependent upon a number of variables. The variables include the particular application for the detector of the present invention, the composition of the sensor element, the sensitivity of the amplifier 80 and indicator circuit 82, the amount of current supplied by power source 64, the resistance of the sensor element 44, and the dimensions of the sensor element 44.

In a test, a palladium filament was used in the electrical bridge circuit of FIG. 2. The palladium filament had a diameter of one mil and a length of 25 millimeters. The filament was connected to a power source having an output voltage ($V_s$) of 2.8 volts and a power ($P_{wr}$) of 164 milliwatts. The voltage ($V_w$) across the filament 44 was 1.27 volts. The filament had a resistance ($R_f$), at operational temperature (T) of 23.4° C., of 9.845 ohms. The current through the filament ($I_{ma}$), during an on-period of the power source, was 129 milliamps.

Figure 3:
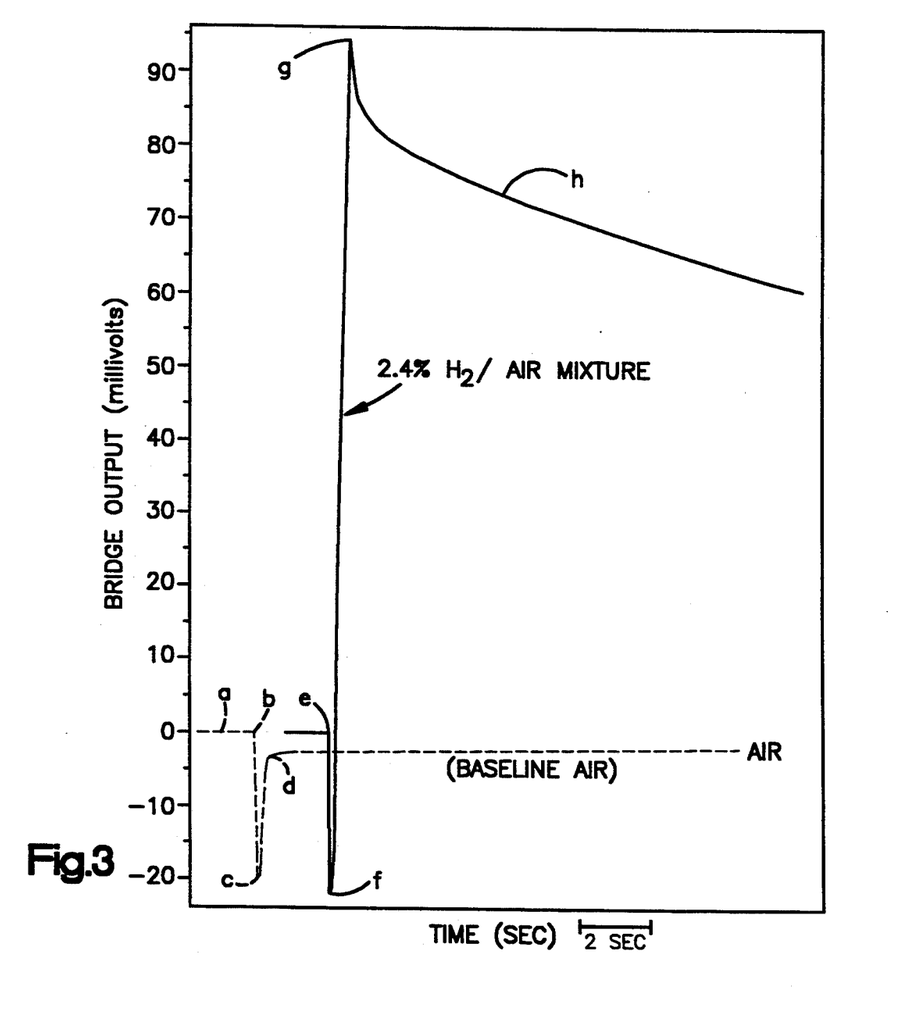
FIG. 3 is a graph showing the heat generation response of a palladium filament in the electrical bridge circuit of FIG. 2, when exposed to a 2.4% hydrogen/air gas mixture.

Referring to FIG. 3, the bridge output is plotted as a function of time. The palladium filament was first exposed to an atmosphere of air alone. The lower dash-line curve in FIG. 3, labelled "baseline air", shows the bridge output in millivolts (mV). Initially the bridge output was zero, along horizontal line "a". At point "b", the power source was turned on. The output took an initial dip to point "c", to about −23 millivolts. The output then recovered to point "d", near zero volts, when balanced by the compensator resistor ($R_c$), and remained constant at this bridge output for the remainder of the test. In this test, the compensator resistor ($R_c$) was not positioned so as to function as a compensating resistance (that is, in the same atmosphere with the sensor filament) and was initially at a different temperature than the sensor filament. This caused the dip to point "c" and recovery to less than zero volts. Had the compensator resistor ($R_c$) been positioned as in an actual use application, the bridge output response, in air, would have been a straight-line response at zero volts throughout the on and off periods.

The test was repeated for an atmosphere of air containing 2.4 mole percent hydrogen. The curve for this test is shown as a solid line in FIG. 3. The palladium filament was allowed to remain in the atmosphere which contained hydrogen for a short period. During this period, no current was passed through the filament. As in the first experiment, the bridge output remained at zero through the off-period.

At the end of the off-period, at point "e", the power source was turned on. This caused the bridge output to dip to a negative voltage at point "f", as with the baseline air test. Had the compensator resistance been positioned in the same atmosphere with the sensor filament, this dip would not have occurred. The output, instead of recovering to near zero volts, as with the baseline air test, rose rapidly to a peak at "g" of about 95 millivolts. This was indicative of a rapid increase in temperature of the palladium filament due to a rapid exothermic reaction of the hydrogen at the surface of the palladium. The bridge output then underwent a slow decay, along curve "h", indicating a slow diffusion of hydrogen from the gaseous environment and continued exothermic reaction of the hydrogen. Measurement of the output voltage was stopped before all of the hydrogen was consumed.

Figure 4:
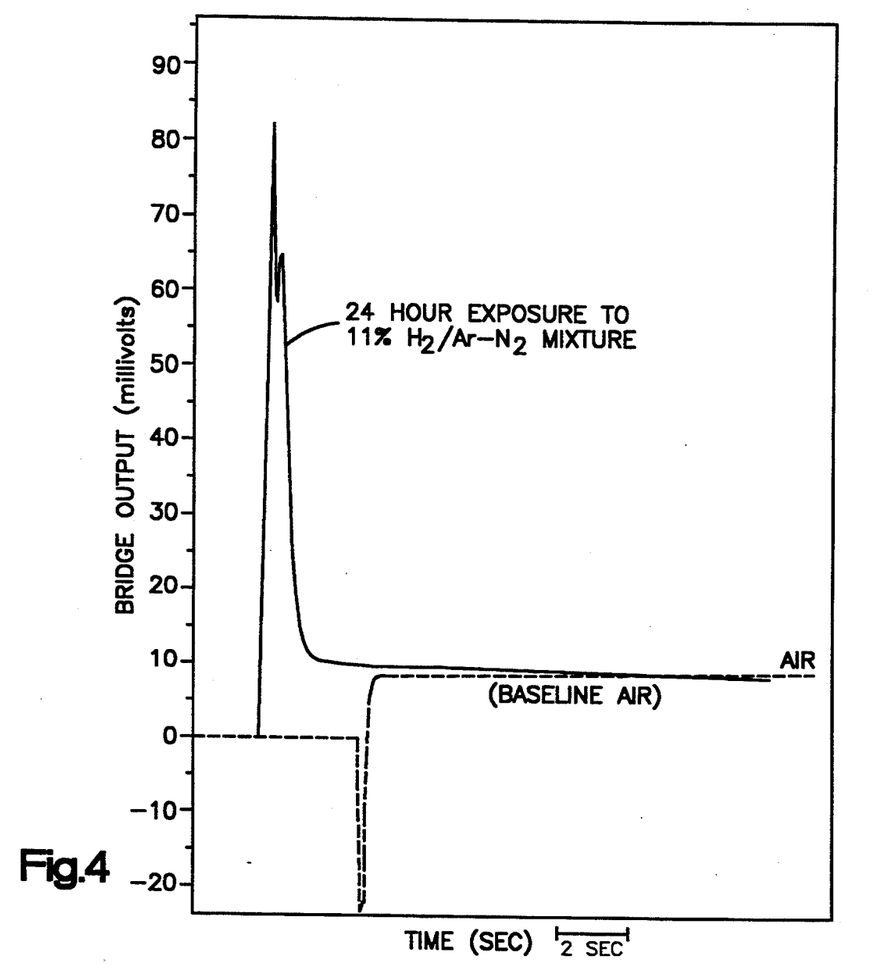
FIG. 4 is a graph showing a heat generation response of a palladium filament in the electrical bridge circuit of FIG. 2, wherein the palladium filament was exposed successively to (a) a static 11% hydrogen in an argon/nitrogen mixture for 24 hours, followed by (b) evacuation and exposure of the palladium filament to atmospheric pressure air containing no hydrogen.

The same test apparatus used to produce the data of FIG. 3 was used to produce the data of FIG. 4. In this test, the ambient temperature (T) was 22.6° C. The filament resistance ($R_f$) at operational temperature was 9.868 ohms. The filament was exposed, for twenty-four hours, to an 11% hydrogen in argon/nitrogen gas mixture. After the exposure, the gas mixture was evacuated and replaced with atmospheric pressure air containing no hydrogen. Otherwise, the test parameters were the same as in the tests of FIG. 3.

A current was then passed through the filament. The bridge output response is shown as the solid line in FIG. 4. As in FIG. 3, a sharp rise/peak was observed. This was indicative of an exothermic reaction of absorbed/stored hydrogen in the palladium. The atmosphere of air contained no hydrogen, so that the exothermic reaction had to be due to the presence of hydrogen in or on the palladium filament from the twenty-four hour exposure prior to evacuation.

The peak in FIG. 4 was sharper than in FIG. 3, and a faster bridge output decay was noted. This is further evidence indicative of a reaction involving only hydrogen that had been absorbed and stored in the palladium filament.

These tests also demonstrate the feasibility of using an off current period to allow the accumulation of an amount of leaked gas, in the vicinity of a sensor element, of sufficient magnitude to activate an alarm during an on current period.

EXAMPLE 2

Figure 5:
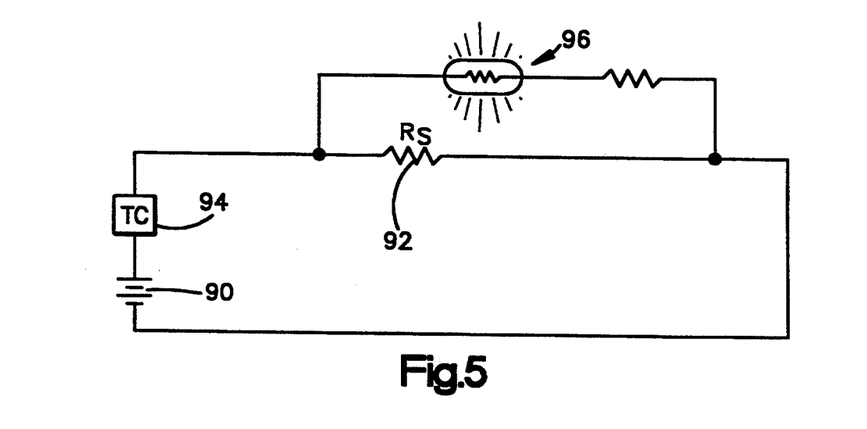
FIG. 5 is an electrical circuit including a sensor element for the vehicle occupant restraint apparatus of FIG. 1 in accordance with another embodiment of the present invention.

This embodiment of the present invention is illustrated in FIG. 5. FIG. 5 shows a circuit which comprises a power source 90 connected to a sensor element, shown as resistor 92 ($R_s$), through a timer circuit 94 ($T_c$). The sensor element 92 is in parallel with an alarm 96.

The sensor element 92 functions as a fuse in the sense that it undergoes an irreversible detectable, chemical or physical change, e.g., combustion reaction or phase change, when exposed to an exothermic reaction of the fuel gas being detected. In the simplest sense, the sensor element 92 melts, interrupting the flow of current through the element and directing the current to the alarm 96.

The sensor element 92 is a binary element consisting of (a) a fine-gauge wire or foil strip made from a meltable or shape changing or easily combusted electrically conducting material and (b) a catalytic material, if required. The sensor element 92 is heated, during an on-period, by the current from the power source 90, to a temperature just below the melting point or reaction temperature of the wire or foil strip. As in the embodiment of Example 1, the sensor element 92 has a much lower resistance than the alarm 96, and the current flow is primarily through the sensor element. In the absence of a combustible fuel, no exothermic reaction takes place, and no phase change of the sensor element occurs.

When a leaked fuel gas is present, an exothermic reaction is promoted. This increases the temperature of the sensor element 92 to the point of melting or reaction. This opens the circuit in which the sensor element 92 is positioned and causes the current to flow to the alarm 96.

Suitable materials for the sensor element 92 which have a low melting temperature or are easily reacted include aluminum, cadmium, copper, lead, magnesium, molybdenum, niobium, palladium, silver, tantalum, thallium, tin, titanium, tungsten, zinc and various alloys. Materials suitable to provide a catalytic coating include those materials, such as palladium and platinum, listed above with respect to the embodiment of Example 1.

As an alternative to use of a material in which the phase change is melting, shape memory metals and alloys or intermetallic forming metals which change in shape in response to temperature can be used. The heat from the exothermic reaction causes the element 92 to increase in temperature to a phase transition point which creates an excessive strain in the element and causes the element to rupture or break contact. Nitinol and other special metals or composite materials are known to exhibit shape change or alloy forming reactions and are thus usable.

EXAMPLE 3

This Example illustrates the ability of a palladium sensor element to absorb hydrogen, and the ability to detect the absorption by direct measurement of the resistance of the sensor element.

The sensor element was a palladium wire. The wire had a length of 32 millimeters and a diameter of 0.001 inches. The wire was connected to a Fluke Company digital multimeter, Model No. 8840-A, and also to a computer programmed to record the voltage reading of the multimeter every minute over a prolonged period.

A first test was conducted using a nitrogen/argon gas mixture containing 12 mole percent hydrogen. A second test was conducted using a nitrogen/argon gas mixture containing 5.7 mole percent hydrogen. In both tests, a one liter bottle was provided. The sensor element was positioned in the bottle. The bottle was first filled with air and a first resistance measurement, representing zero percent absorption of hydrogen in the sensor element, was made. The bottle was then evacuated and back-filled with the gas mixture containing hydrogen, and resistance measurements were taken for a prolonged period. At a certain point, after substantial absorption of hydrogen by the sensor element, the bottle was again evacuated, and then back-filled with nitrogen. Resistance measurements were again taken for a prolonged period. During this second prolonged period, a small positive flow of nitrogen was maintained through the bottle to prevent a build-up of hydrogen within the bottle due to desorption of the hydrogen from the sensor element.

Figure 6:
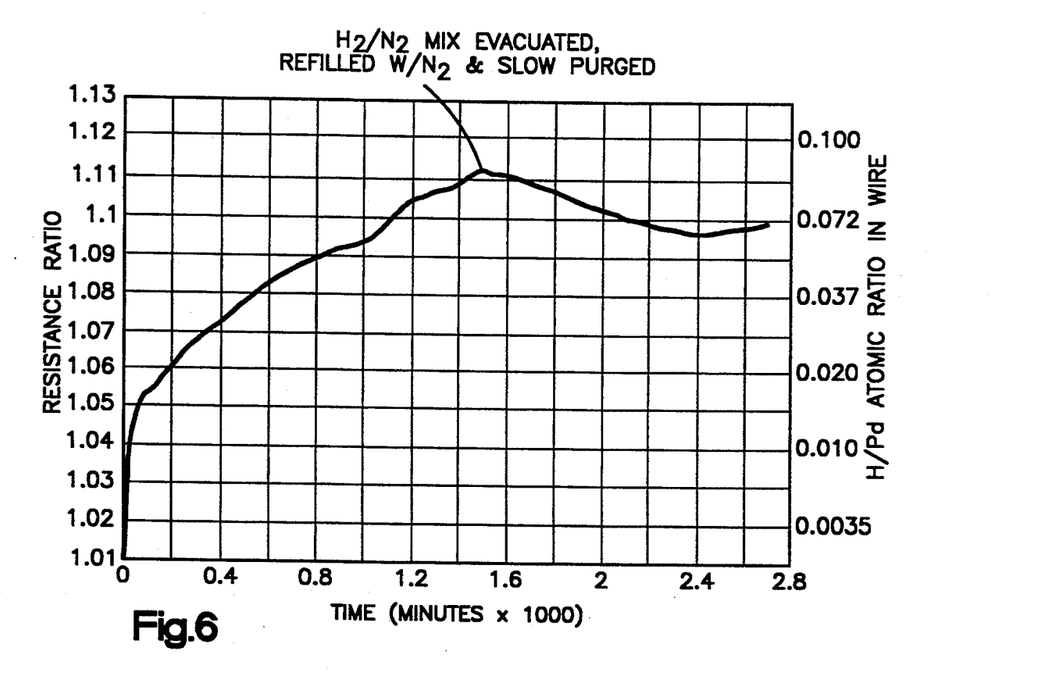
FIG. 6 is a graph plotting hydrogen absorption in a palladium filament exposed to a gas mixture containing 12 mole percent hydrogen.
Figure 7:
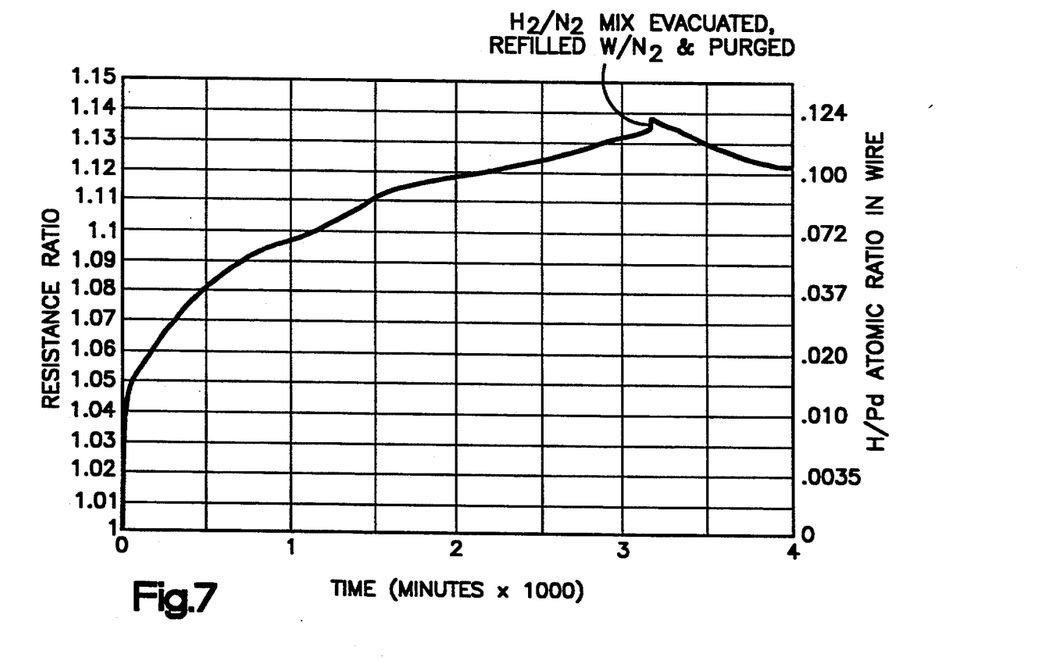
FIG. 7 is a graph plotting hydrogen absorption in a palladium filament exposed to a gas mixture containing 5.7% hydrogen.

The results of the tests are shown in FIGS. 6 and 7. In both Figures, the resistance ratio of the sensor element is plotted against the test time, The resistance ratio is the ratio of the resistance of the sensor element at an indicated time from the start of the test divided by the resistance of the sensor element at the start of the test (the measurement representing zero absorption of hydrogen in the sensor element). Both Figures also provide, along the right hand side of each Figure, values indicating the atomic ratio of the hydrogen absorbed in the sensor element. These ratios were taken from a graph on page 11 of a book entitled "Palladium Hydrogen System", by F. A. Lewis, Academic Press, 1967. The graph plots the resistance of a palladium wire against the atomic ratio of hydrogen absorbed in the wire.

Referring to FIG. 6, it can be seen that after an initial exposure period of the sensor element to the hydrogen containing gas, the resistance in the sensor element increased rapidly to a ratio of more than 1.11 at about 1,500 minutes (25 hours). This resistance represented the absorption of about 0.09 atomic percent hydrogen in the palladium wire. At about 1,500 minutes, the absorption was discontinued.

Referring to FIG. 7, it can be seen that similar results were obtained with the atmosphere containing 5.7 mole percent hydrogen.

In operation, the sensor element of this Example would be used in a manner similar to Examples 1 and 2. For a vehicle occupant restraint, the sensor element would be positioned within an envelope surrounding at least a portion of the container for a hydrogen containing gas used to deploy the restraint. The envelope would preferably contain air. An electric current would intermittently be supplied to the sensor element. The sensor element would be in a bridge circuit similar to that of FIG. 2. In the event of a leak from the gas container, a build-up of absorbed hydrogen in the sensor element, during an off-period of the timing means, would occur. During an on-period of the timing means, an imbalance would occur in the bridge circuit, which would be detected by an indicator means similar to the detection in Examples 1 and 2.

From the above description of the invention, those skilled in the art will perceive improvements, changes and modifications in the present invention. Such improvements, changes and modifications within the skill of the art are intended to be covered by the appended claims.

Having described the invention, the following is claimed:

1. A detector for detecting leaks of a gas comprising;
   (a) an electrical circuit comprising
      (i) an electrically conductive sensor element;
      (ii) a power source;
      (iii) a timing means for providing an intermittent electric current from said power source through said sensor element; and
   (b) means positioning said sensor element so that it is exposed to the gas if leaked;
   the sensor element consisting essentially of a catalytic material that initiates an exothermic chemical reaction when exposed to said gas and has an electrical resistance which varies with an increase in temperature from said exothermic reaction;
   the timing means having an off-period of long duration to allow accumulation of the gas around or by the sensor element.

2. The detector of claim 1 wherein the sensor element consists essentially of a catalytic material and said exothermic reaction is a heterogeneous combustion reaction.

3. The detector of claim 2 wherein said exothermically reactable gas is hydrogen and the material of said sensor element is palladium.

4. The detector of claim 3 wherein said timing means has an off-period of sufficient duration for the absorption and storage of a detectable amount of hydrogen in the palladium.

5. The detector of claim 4 wherein said sensor element is in the form of a filament, foil or film.

6. A detector for detecting leaks of a gas comprising:
   (a) an electrical circuit comprising:
      (i) an electrically conductive sensor element;
      (ii) a power source;
      (iii) a timing means for providing an intermittent electric current from said power source through said sensor element; and
   (b) means positioning said sensor element so that it is exposed to the gas if leaked;

the sensor element comprising a material having an electrical resistance which varies when the sensor element is exposed to said gas;

the timing means having an off-period of long duration to allow accumulation of the gas around or by the sensor element;

wherein said sensor element is a fuse material which interrupts said electrical circuit.

7. The detector of claim 1 wherein said electrical circuit comprises an indicator means responsive to an electrical resistance change of the sensor element.

8. The detector of claim 7 in which said indicator means includes a bridge circuit and said sensor element is in said bridge circuit.

9. The detector of claim 7 in which said sensor element is a material which absorbs and stores the leaked gas and exhibits a resistance change as a result of said absorption and storage.

10. The detector of claim 9 in which said sensor element consists essentially of pure palladium and said gas is hydrogen, said timing means having an off-period of sufficient duration for the absorption and storage of a detectable amount of hydrogen in the palladium.

11. An inflator for a vehicle occupant restraint comprising:
(a) a container means for containing a gas;
(b) a vehicle occupant restraint;
(c) means for directing said gas to said vehicle occupant restraint;
(d) a leak detector for detecting a leak from said container means;
said leak detector comprising:
(i) an electrical circuit, said circuit comprising;
(1) an electrically conductive sensor element;
(2) a power source;
(3) a timing means for providing an intermittent electric current from said power source through said sensor element;
(ii) means positioning said sensor element so that it is exposed to the gas if leaked,
the sensor element comprising a material having an electrical resistance which increases when the sensor element is exposed to said gas;
the timing means having an off-period of long duration to allow accumulation of the gas around or by the sensor element.

12. The inflator of claim 11 wherein said gas is an exothermically reactable gas and the electrical resistance of the sensor element varies in response to a temperature increase of the sensor element, the sensor element comprising a material capable of initiating the exothermic reaction of the gas when an electric current is passed through the sensor element.

13. The inflator of claim 12 wherein the sensor element comprises a catalytic material and said exothermic reaction is a heterogeneous combustion reaction.

14. The inflator of claim 13 wherein said exothermically reactable gas is hydrogen and the material of said sensor element is palladium.

15. The inflator of claim 14 wherein the timing means has an off-period of sufficient duration for the absorption and storage of a detectable amount of hydrogen in the palladium.

16. The inflator of claim 13 wherein said sensor element is in the form of a filament, foil or film.

17. The inflator of claim 11 in which said sensor element is a fuse material which interrupts said electrical circuit.

18. The inflator of claim 11 wherein said electrical circuit comprises an indicator means responsive to an electrical resistance change of the sensor element.

19. The inflator of claim 18 in which said indicator means includes a bridge circuit and said sensor element is in said bridge circuit.

20. The inflator of claim 18 in which said sensor element is a material which absorbs and stores the leaked gas and exhibits a resistance change as a result of said absorption and storage.

21. The inflator of claim 20 in which said sensor element comprises palladium and said gas is hydrogen, said timing means having an off-period of sufficient duration for the absorption and storage of a detectable amount of hydrogen in the palladium.

22. The inflator of claim 11 including an envelope circumscribing at least a portion of said container means, and means for positioning said sensor element in said envelope.

23. A method for detecting a leak of a gas into an atmosphere comprising the steps of:
(a) exposing an electrically conductive sensor element to the atmosphere;
(b) providing an indicator means responsive to a change in the resistance of the sensor element;
(c) applying an intermittent electric current to the sensor element; and
(d) maintaining a current off-period for a duration to allow accumulation of leaked gas in said atmosphere;
the sensor element consisting essentially of a catalytic material which initiates an exothermic chemical reaction when exposed to said gas and has an electrical resistance which varies with an increase in temperature from said exothermic reaction.

24. The method of claim 23 wherein the sensor element consists essentially of a catalytic material and said exothermic reaction is a heterogeneous combustion reaction.

25. The method of claim 24 wherein said exothermically reactable gas is hydrogen and the material of said sensor element is palladium.

26. The method of claim 25 wherein the current off-period is of sufficient duration for the absorption and storage of a detectable amount of hydrogen in the palladium.

27. A method for detecting a leak of a gas into an atmosphere comprising the steps of:
(a) exposing an electrically conductive sensor element to the atmosphere;
(b) providing an indicator means responsive to a change in the resistance of the sensor elements;
(c) applying an intermittent electric current to the sensor element; and
(d) maintaining a current off-period for a duration to allow accumulation of leaked gas in said atmosphere;
the sensor element comprising a material which has an electrical resistance which varies when the sensor element is exposed to said gas;
wherein said sensor element is a fuse material which interrupts said electrical circuit.

28. The method of claim 23 in which said indicator means includes a bridge circuit and said sensor element is in said bridge circuit.

29. The method of claim 23 in which said sensor element is a material which absorbs the leaked gas and exhibits a resistance change as a result of said absorption.

30. The method of claim 29 in which said sensor element consists essentially of palladium and said gas is hydrogen.

31. A method of detecting a leak of hydrogen into an oxygen containing atmosphere comprising the steps of:
   (a) exposing an electrically conductive sensor element, having an electrical resistance dependent upon the temperature of said element, to the atmosphere;
   (b) providing an indicator means for detecting a resistance change in said sensor element;
   (c) applying an intermittent electric current to said sensor element;
   (d) maintaining a current off-period for a duration to allow accumulation of leaked gas into said atmosphere, said sensor element having a palladium surface effective to absorb and store hydrogen which is accumulated in said atmosphere during said off-period; and
   (e) initiating a flow of electric current through the sensor element for a duration to desorb the hydrogen from the palladium and catalytically exothermically react the hydrogen in the atmosphere.

32. A method of detecting a leak of an exothermically reactable gas from a container for the gas in a vehicle occupant restraint apparatus wherein the gas functions to deploy an occupant restraint, said method comprising the steps of:
   (a) providing an envelope circumscribing at least a portion of the container;
   (b) providing an electrically conductive sensor element;
   (c) positioning the sensor element within the envelope;
   (d) providing an indicator means responsive to a change in the resistance of the sensor element;
   (e) applying an intermittent electric current to the sensor element; and
   (f) maintaining a current off-period for a duration to allow accumulation of leaked gas in the envelope; the sensor element comprising a material which has an electrical resistance which varies when the sensor element is exposed to said gas.

33. The method of claim 32 wherein the electrical resistance of the sensor element varies in response to a temperature increase of the sensor element, the sensor element comprising a material capable of initiating the exothermic reaction of the gas when an electric current is passed through the sensor element.

34. The method of claim 33 wherein the sensor element comprises a catalytic material and said exothermic reaction is a heterogeneous combustion reaction.

35. The method of claim 34 wherein said exothermically reactable gas is hydrogen and the material of said sensor element is palladium.

36. The method of claim 35 wherein the hydrogen is absorbed by and stored in the palladium.

37. The method of claim 32 in which said sensor element is a material which absorbs the leaked gas and exhibits a resistance change as a result of said absorption.

38. The method of claim 37 in which said sensor element comprises palladium and said gas is hydrogen.

39. The method of claim 32 in which said sensor element is part of an electrical circuit and said sensor element is a fuse material which interrupts said electrical circuit.

40. The method of claim 32 in which said indicator means includes a bridge circuit and said sensor element is in said bridge circuit.

41. A method for detecting leaks of a gas from a source comprising positioning the detector of claim 1 adjacent said source.

42. A method for detecting leaks of a gas from a gas container for a vehicle occupant restraint apparatus comprising positioning an envelope around at least a portion of said gas container and then positioning the sensor element of the leak detector of claim 1 in said envelope.

43. A detector for detecting leaks of a gas comprising;
   (a) an electrical circuit comprising an electrically conductive sensor element and a power source;
   (b) means positioning said sensor element so that is exposed to the gas if leaked, the sensor element consisting essentially of a pure chemical element which absorbs and stores the gas when the sensor element is exposed to the gas and has an electrical resistance which increases with the amount of gas absorbed; and
   (c) indicator means responsive to a resistance increase of the sensor element.

44. The detector of claim 43 in which the sensor chemical element is pure palladium.

45. A detector for detecting leaks of an exothermically reactable gas comprising;
   (a) an electrical circuit comprising an electrically conductive sensor element and a power source;
   (b) means positioning said sensor element so that it is exposed to the gas if leaked, the sensor element comprising a catalytic material capable of initiating the exothermic reaction of the gas when an electric current is passed through the sensor element and a fuse material which interrupts the electrical circuit at a predetermined temperature of the sensor element.

* * * * *

UNITED STATES PATENT AND TRADEMARK OFFICE
CERTIFICATE OF CORRECTION

PATENT NO.  : 5,428,988
DATED       : July 4, 1995
INVENTOR(S) : John A. Starkovich It is certified that error appears in the above-indentified patent and that said Letters Patent is hereby corrected as shown below:

Column 12, line 58, change "4" to --2--.

Signed and Sealed this

Seventeenth Day of October, 1995

Attest:

BRUCE LEHMAN

Attesting Officer

Commissioner of Patents and Trademarks